United States Patent
Tang et al.

(10) Patent No.: US 10,382,387 B2
(45) Date of Patent: Aug. 13, 2019

(54) OID CONFIGURATION, RESOLUTION METHOD, CLIENT, NODE, DATABASE AND STORAGE MEDIUM

(71) Applicant: ZTE Corporation, Shenzhen, Guangdong (CN)

(72) Inventors: Kai Tang, Shenzhen (CN); Hua Jiang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 181 days.

(21) Appl. No.: 15/524,025

(22) PCT Filed: Jun. 11, 2015

(86) PCT No.: PCT/CN2015/081273
§ 371 (c)(1),
(2) Date: May 3, 2017

(87) PCT Pub. No.: WO2016/070622
PCT Pub. Date: May 12, 2016

(65) Prior Publication Data
US 2017/0331784 A1    Nov. 16, 2017

(30) Foreign Application Priority Data
Nov. 4, 2014    (CN) .......................... 2014 1 0614065

(51) Int. Cl.
*H04L 29/12* (2006.01)
*G06Q 10/08* (2012.01)
*G06F 16/38* (2019.01)

(52) U.S. Cl.
CPC ........ *H04L 61/1511* (2013.01); *G06F 16/381* (2019.01); *G06Q 10/087* (2013.01); *H04L 61/3045* (2013.01)

(58) Field of Classification Search
CPC ............ H04L 61/1511; H04L 61/3045; G06Q 10/087; G06F 17/30725
See application file for complete search history.

(56) References Cited

U.S. PATENT DOCUMENTS

2003/0101169 A1\* 5/2003 Bhatt ................ G06F 17/30569
2005/0198017 A1\* 9/2005 Gaponoff .......... G06F 17/30327
(Continued)

FOREIGN PATENT DOCUMENTS

CN     102713963 A    10/2012
CN     102882990 A     1/2013
(Continued)

OTHER PUBLICATIONS

International Search Report in international application No. PCT/CN2015/081273, dated Sep. 9, 2015, 2 pgs.
(Continued)

*Primary Examiner* — Abdullahi E Salad
(74) *Attorney, Agent, or Firm* — Cooper Legal Group, LLC

(57) ABSTRACT

Disclosed are an Object Identifier (OID) configuration, a configuration method, an OID Resolution System (ORS) client, an OID node and a database thereof. The OID configuration method may include: a parent OID node performs Domain Name System (DNS) configuration on a service provided by an OID tree to form a DNS resource record, the OID tree including the parent OID node and at least one child OID node of the parent OID node; and the parent OID node stores the DNS resource record in a DNS database of the parent OID node. Also disclosed is a computer storage medium.

20 Claims, 4 Drawing Sheets

(56) References Cited

U.S. PATENT DOCUMENTS

| | | | |
|---|---|---|---|
| 2009/0200377 A1 | 8/2009 | Lee | |
| 2012/0290616 A1 | 11/2012 | Lee | |
| 2013/0073524 A1* | 3/2013 | Bentkofsky | G06F 17/30371 |
| | | | 707/690 |
| 2013/0188707 A1* | 7/2013 | Shimizu | H04N 19/597 |
| | | | 375/240.12 |

FOREIGN PATENT DOCUMENTS

| | | |
|---|---|---|
| CN | 103248726 A | 8/2013 |
| CN | 103647813 A | 3/2014 |
| WO | 2007102646 A1 | 9/2007 |

OTHER PUBLICATIONS

English Translation of the Written Opinion of the International Search Authority in international application No. PCT/CN2015/081273, dated Sep. 9, 2015, 6 pgs.

Gs1: "GS1 Object Name Service (ONS)", Jan. 2013, Version 2.0.1, Ratified Standard, pp. 1-34.

"A Quick Query Methods for ONS System based on EPC", Nov. 2013, Jun Bai, Qiang Zhu, Qiang Chen, Bai-Ling Wang and Liu Yang, International Jounrnal of Hybrid Information Technology, vol. 6, No. 6, pp. 149-160.

"Local Caching Architecture for RFID Tag Resolution", Dec. 2007, Prakash Thadani, Thesis Submitted to the Department of Electrical and Computer Eninggering and the Faculty of the Graduate School of Wichita State University in partial fulfillment of the requirement of the degree of Master of Science, Withita State University, USA, 166 pgs.

Supplementary European Search Report in European application No. 15857592.8, dated Oct. 9, 2017, 7 pgs.

"Information technology—Open systems interconnection—Object identifier resolution system", Aug. 29, 2010, Series X: Data Networks, Open System Communications and Security; International Telecommunications Union, ITU-T X.672, 30 pgs.

* cited by examiner

OID CONFIGURATION, RESOLUTION METHOD, CLIENT, NODE, DATABASE AND STORAGE MEDIUM

TECHNICAL FIELD

The disclosure relates to the field of information processing, and in particular to an Object Identifier (OID) configuration, a configuration method, an OID Resolution System (ORS) client, an OID node and a database thereof, and a computer storage medium.

BACKGROUND

An OID is an identification mechanism jointly proposed by the International Standardization Organization (ISO)/International Electrotechnical Commission (IEC) and the International Telecommunication Union (ITU), and names an object of any type globally, unambiguously and uniquely by using a hierarchical tree structure. The OID which has the advantages of hierarchical flexibility, high expandability, clear management mechanism and the like, is compatible with an existing identification mechanism, and has been widely applied to the fields of information security, health care, network management and the like. By December, 2013, 891,938 top OIDs had been registered in an international OID tree. Recently, with the development of technologies and industries such as the Internet of Things, it is urgently necessary to perform identification management and information management on various objects, so the OID is further focused. With respect to management mechanisms, superior technologies and technical maturity, application popularization, international and domestic standardization and the like, the OID is the most appropriate solution for object identification management.

An OID coding system is a hierarchical symbol system, used to solve, correspondingly, the problem of uniform query of information of an object corresponding to the OID. Meanwhile, in the conventional art, an ORS is also defined, to organize global OIDs into a hierarchical database system through the Internet by using a Domain Name System (DNS) technology, where an authorization connection is conducted between a superior DNS and a subordinate DNS through a Name Server (NS) resource record. Each DNS stores service configuration information of a corresponding OID object through a resource record of an NAPTR type.

In some scenarios, a child OID node cannot deploy a corresponding DNS to provide a resolution service because of a variety of reasons. At this time, a DNS of a parent OID cannot perform service butting with a DNS node of a child OID, that is, an OID in a child tree corresponding to the child OID cannot be resolved. However, a practical environment has a requirement for resolving an object in a child OID tree through the ORS.

SUMMARY

In view of this, the embodiments of the disclosure are intended to provide an OID configuration, a configuration method, an ORS client, an OID node, a database thereof, and a computer storage medium, which are used to solve the problems that an OID cannot be resolved and a parent OID node and child OID nodes cannot be butted due to DNS configuration for child OID services or no DNS configuration.

The technical solutions of the disclosure are implemented as follows. According to a first aspect in the embodiments of the disclosure, an OID configuration method is provided, which may include:

a parent OID node performs DNS configuration on a service provided by an OID tree to form a DNS resource record, the OID tree including the parent OID node and at least one child OID node of the parent OID node; and the parent OID node stores the DNS resource record in a DNS database of the parent OID node.

On the basis of the solutions, the step that a parent OID node performs DNS configuration on a service provided by an OID tree to form a DNS resource record may include:

the parent OID node generates a DNS wildcard mapping name, the DNS wildcard mapping name including a service identifier, a wildcard, a domain name inverted order OID and an ORS DNS root;

the parent OID node generates an authorization expression of each service type of the OID tree, the authorization expression providing a basis for generating service configuration information of the OID tree; and the parent OID node generates a DNS resource record according to the DNS wildcard mapping name, the service type and the authorization expression.

On the basis of the solutions, the authorization expression may include a regular expression and a replacement expression;

the regular expression and an OID resolution input may jointly determine groups; and the replacement expression and the groups may jointly execute a replacement operation to form the service configuration information.

On the basis of the solutions, the service configuration information may include a service providing identifier address or a service content.

On the basis of the solutions, a service identifier may include an OID service identifier or a non-OID service identifier; and the OID service identifier may include an OID service wildcard or an OID service type identifier.

According to a second aspect in the embodiments of the disclosure, an OID universal resolution method is provided, which may include:

an ORS client sends a query request to a DNS database of a parent OID node on the basis of an OID resolution input;

the ORS client receives feedback information sent, on the basis of the query request, by the DNS database of the parent OID node; and the ORS client determines service configuration information of an OID tree according to the feedback information, the OID tree including the parent OID node and at least one child OID node of the parent OID node.

On the basis of the solutions, the OID resolution input may include a DNS mapping name and a service type;

the step that the ORS client receives feedback information sent, on the basis of the query request, by the DNS database of the parent OID node may include:

the ORS client receives an authorization expression returned, according to the OID resolution input, by the DNS database of the parent OID node; and the step that the ORS client determines service configuration information of an OID tree according to the feedback information may include:

the ORS client determines the service configuration information according to the DNS mapping name and the authorization expression.

On the basis of the solutions, the OID resolution input may include a DNS mapping name; and the step that the ORS client receives feedback information sent, on the basis of the query request, by the DNS database of the parent OID node may include:

a DNS resource record sent, on the basis of the query request, by the DNS database of the parent OID node is received;

the ORS client determines the service configuration information of the OID tree according to the feedback information;

the DNS resource record is queried according to the service type, and the authorization expression is determined; and the service configuration information is determined according to the DNS mapping name and the authorization expression.

On the basis of the solutions, the authorization expression may include a regular expression and a replacement expression; and the step that the ORS client determines the service configuration information according to the DNS mapping name and the authorization expression may include:

the ORS client determines groups according to an OID and the regular expression; and the ORS client executes a replacement operation on the obtained groups and the replacement expression to obtain the service configuration information.

According to a third aspect in the embodiments of the disclosure, an OID universal resolution method is provided, which may include:

a DNS database of a parent OID node receives an OID resolution input sent by an ORS client, the OID resolution input being an OID resolution input of a service provided by an OID tree, and the OID tree including the parent OID node and at least one child OID node of the parent OID node;

the DNS database of the parent OID node queries a DNS resource record according to the OID resolution input to form a query result; and the DNS database of the parent OID node sends feedback information to the ORS client according to the query result.

On the basis of the solutions, the OID resolution input may include a DNS mapping name and a service type;

the step that the DNS database of the parent OID node queries a DNS resource record according to the OID resolution input to form a query result may include:

a resource record is searched for an authorization expression according to an OID and the service type; and the step that the DNS database of the parent OID node sends feedback information to the ORS client according to the query result may include:

the found authorization expression is sent to the ORS client.

On the basis of the solutions, the OID resolution input may include a DNS mapping name;

the step that the DNS database of the parent OID node queries according to the OID resolution input to form a query result may include:

the DNS resource record is queried according to the DNS mapping name; and the step that the DNS database of the parent OID node sends feedback information to the ORS client according to the query result may include:

the DNS resource record matched with the DNS mapping name is sent to the ORS client.

On the basis of the solutions, the authorization expression may include a regular expression and a replacement expression;

the regular expression and the OID resolution input may jointly determine groups; and the replacement expression and the groups may jointly execute a replacement operation to form service configuration information.

According to a fourth aspect in the embodiments of the disclosure, an OID node is provided. The OID node may be a parent OID node and may include:

a forming unit, configured to perform DNS configuration on a service provided by an OID tree to form a DNS resource record, the OID tree including the parent OID node and at least one child OID node of the parent OID node; and a storage unit, configured to store the DNS resource record in a DNS database of the parent OID node.

On the basis of the solutions, the forming unit may be configured to generate a DNS wildcard mapping name, generate an authorization expression of each service type of the OID tree, and generate a DNS resource record according to the DNS wildcard mapping name, the service type and the authorization expression, wherein the DNS wildcard mapping name includes a service identifier, a wildcard, a domain name inverted order OID and an ORS DNS root; and the authorization expression provides a basis for generating service configuration information of the OID tree.

According to a fifth aspect in the embodiments of the disclosure, an ORS client is provided, which may include:

a first sending unit, configured to send a query request to a DNS database of a parent OID node on the basis of an OID resolution input;

a first receiving unit, configured to receive feedback information sent, on the basis of the query request, by the DNS database of the parent OID node; and a determination unit, configured to determine service configuration information of an OID tree according to the feedback information, the OID tree including the parent OID node and at least one child OID node of the parent OID node.

On the basis of the solutions, the OID resolution input may include an OID corresponding to an OID node and a service type;

the first receiving unit may be configured to receive an authorization expression returned, according to the OID resolution input, by the DNS database of the parent OID node; and the first receiving unit may be configured to determine the service configuration information according to a DNS mapping name and the authorization expression.

On the basis of the solutions, the OID resolution input may include a DNS mapping name;

the first receiving unit may be configured to receive a DNS resource record sent, on the basis of the query request, by the DNS database of the parent OID node, and enable the ORS client to determine the service configuration information of the OID tree according to the feedback information; and the determination unit may be configured to query the DNS resource record according to the service type, determine the authorization expression, and determine the service configuration information according to the DNS mapping name and the authorization expression.

According to a sixth aspect in the embodiments of the disclosure, a DNS database of an OID node is provided, which may include:

a second receiving unit, configured to receive an OID resolution input sent by an ORS client, the OID resolution input being an OID resolution input of a service provided by an OID tree, and the OID tree including the parent OID node and at least one child OID node of the parent OID node;

a query unit, configured to query a DNS resource record according to the OID resolution input to form a query result; and a second sending unit, configured to send feedback information to the ORS client according to the query result.

On the basis of the solutions, the OID resolution input may include an OID corresponding to an OID node in the OID tree and a service type;

the query unit may be configured to search a resource record for an authorization expression according to the OID and the service type; and the second sending unit may be configured to send the found authorization expression to the ORS client.

On the basis of the solutions, the OID resolution input may include a DNS mapping name;

the query unit may be configured to query the DNS resource record according to the DNS mapping name; and the second sending unit may be configured to send the DNS resource record matched with the DNS mapping name to the ORS client.

According to a seventh aspect in the embodiments of the disclosure, a computer storage medium is also provided. A computer-executable instruction may be stored in the computer storage medium. The computer-executable instruction may be used for at least one of the aforementioned methods.

According to the OID configuration method, the OID resolution method, the OID node, the database and the computer storage medium in the embodiments of the disclosure, a parent OID node performs DNS configuration on a service provided by an OID tree. Thus, the parent OID node performs DNS configuration on services provided for child OID nodes by the parent OID node, and the parent OID node performs uniform DNS configuration and management on the services of the child OID nodes, so the problems that an OID cannot be resolved and the parent OID node and the child OID nodes cannot be butted due to DNS configuration for the child OID nodes or no DNS configuration can be solved. Meanwhile, the parent OID node performs uniform DNS configuration and management on the service of the OID tree, the child OID nodes do not need to be configured with DNSs, and a DNS database does not need to be formed, thus reducing the deployment cost of the child OIDs. Compared with idling of some resources in the DNS database after deployment of a DNS database for each child OID, a mode of uniform configuration and management centralized configuration through the parent OID node has the advantages that the OID deployment cost is reduced for the whole OID tree, and the resource utilization rate can be improved.

DETAILED DESCRIPTION

The technical solutions of the disclosure will be further elaborated in detail hereinbelow with reference to the drawings and specific embodiments. It will be appreciated that preferable embodiments illustrated hereinbelow are only used to illustrate and explain the disclosure without limiting the disclosure.

Embodiment 1

Figure 1:
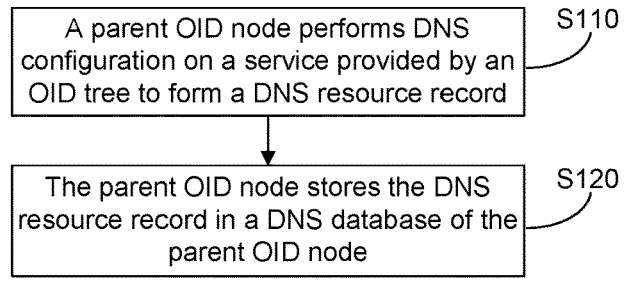
FIG. 1 is a first flowchart of an OID configuration method according to an embodiment of the disclosure.

As shown in FIG. 1, the embodiment provides an OID configuration method, which includes the steps as follows.

Step S110: A parent OID node performs DNS configuration on a service provided by an OID tree to form a DNS resource record, the OID tree including the parent OID node and at least one child OID node of the parent OID node.

Step S120: The parent OID node stores the DNS resource record in a DNS database of the parent OID node.

In the embodiment, performing, by the parent OID node, DNS configuration on the service provided by the OID tree includes: performing, by the parent OID node, DNS configuration on an own service of the parent OID node, and further includes: performing DNS configuration on a service provided by a child OID node connected behind the parent OID node. The parent OID node performs DNS configuration on the service provided by the child OID node, so the child node will not need to perform DNS configuration by itself, and a corresponding DNS database will not be generated on the child OID node. Thus, the DNS database of the parent OID node stores a DNS resource record of the child OID node, so during DNS resolution, the problem that resolution cannot be performed due to no configuration of the DNS database in the child OID node will not be caused.

The DNS database of the parent OID node not only includes service configuration information of the parent OID node, but also will include service configuration information of at least one child OID node. The parent OID node may perform configuration by using any of existing methods. Specific configuration methods will not be elaborated herein in detail.

Figure 2:
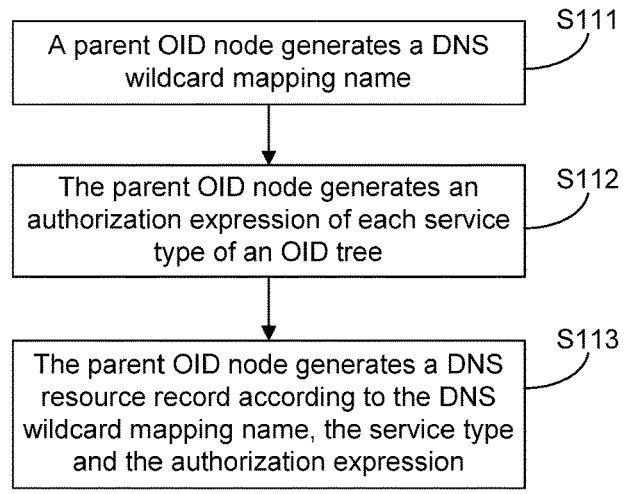
FIG. 2 is a second flowchart of an OID configuration method according to an embodiment of the disclosure.

As shown in FIG. 2, Step S110 in the embodiment may specifically include the steps as follows.

Step S111: The parent OID node generates a DNS wildcard mapping name, the DNS wildcard mapping name including a service identifier, a wildcard, a domain name inverted order OID and an ORS DNS root;

Step S112: The parent OID node generates an authorization expression of each service type of the OID tree, the authorization expression providing a basis for generating service configuration information of the OID tree.

Step S123: The parent OID node generates a DNS resource record according to the DNS wildcard mapping name, the service type and the authorization expression.

Compared with the existing DNS mapping name, the DNS universal mapping name in the embodiment further includes a wildcard *; and adding of the wildcard enables the parent OID node to configure services provided by all OID nodes in the OID tree in batches. The domain name inverted order OID may make it convenient for the parent OID node to determine whether the OID node is the child OID node thereof or itself.

The child OID nodes include multiple stages of child OID nodes on a child tree using the parent OID node as a root, an OID node directly connected below the parent OID node may be a first-stage child OID node, and an OID node connected below an $n^{th}$-stage OID node may be an $n+1^{th}$-stage child OID node. When n is equal to 1, an OID node connected below the first-stage OID node is a second-stage child OID node. In a specific implementation process, the OID tree includes at least two stages of child OID nodes preferably.

Introduction of the wildcard facilitates fuzzy matching during mapping matching later. During configuration, the parent OID node configures an OID space, and child OIDs using the parent OID in the OID space as a root can be matched successfully. Specifically, if the parent OID in the OID space is 1.2.156.102, the child OIDs such as 1.2.156.102.1, 1.2.156.102.8 and 1.2.156.102.9 can be matched successfully during DNS mapping matching.

The service identifier in the DNS universal mapping name is a mark for identifying a service type, and may specifically include an OID service identifier and a non-OID service identifier. The non-OID service identifier is an identifier for a non-OID service type. The OID service identifier may be divided into an OID service wildcard and an OID service type identifier. The OID service wildcard is an identifier distinguished from the non-OID service identifier. The OID service wildcard may specifically be ors-dummy. The OID service type identifier may include an OID registration service identifier, an OID query service identifier, an OID modification service identifier, and etc.

The domain name inverted order OID is an inverted order OID. Specifically, a forward order parent OID is 1.2.156.102.5, and the domain name inverted order OID is 5.102.156.2.1, where, if the service is a service provided by an OID node A, the domain name inverted order OID is a domain name inverted order OID of the OID node A. DNS universal configuration names of services, in the same type, provided by different OID nodes are different, but authorization expressions are identical. If three OID nodes in the OID tree provide three services in the same service type, the parent OID node may uniformly configure the three identical services although receiving three different DNS universal mapping names, so as to form a DNS resource record.

The DNS universal mapping name formed by configuration in the embodiment introduces a wildcard on the basis of the existing DNS mapping name, so the parent OID node may configure services in the OID tree in batches, the configuration task load of the parent OID node may be greatly reduced, and the problems of long configuration time and low configuration efficiency resulting from heavy configuration load of the parent OID node can be avoided even if all the services provided by the child OID nodes are configured by the parent OID node. The method adopted in the embodiment can effectively improve the DNS configuration efficiency of the parent OID node.

Specifically, an OID tree formed by using a parent OID node as a root includes 10 OID nodes. If each OID node can provide 20 services and a DNS mapping name that does not include a wildcard is adopted (the DNS mapping name may include a service identifier, a domain name inverted order OID and an ORS DNS root), it is necessary to form 10*20 resource records. During configuration according to the DNS universal mapping name in the embodiment, a minimum unit is configured for an OID node of which the service type is batch matching, batch configuration is performed, and it is only necessary to form 20 resource records including an authorization expression. By means of subsequent resolution and replacement between an OID and an authorization expression of each OID node, service configuration information of a certain service on a specific OID may be accurately determined, thus greatly reducing the configuration task load and the number of resource records formed by configuration.

The authorization expression includes a regular expression and a replacement expression.

The regular expression and an OID resolution input jointly determine groups.

The replacement expression and the groups jointly execute a replacement operation to form the service configuration information.

The regular expression is also called a regular notation or a conventional notation. The regular expression describes and matches a series of character strings satisfying a certain syntactic rule by using a single character string. In many text editors, the regular expression is usually used for retrieving and replacing those texts satisfying a certain mode.

The replacement expression finds a part to be replaced by scanning and matching, and is an expression for replacing the groups.

Usually, a service type corresponds to an authorization expression and a DNS resource record. For example, 30 service types are provided in the OID tree and at least one service type may be provided by multiple OID nodes in the OID tree. 30 DNS resource records will be formed by using the method in the embodiment, and during specific configuration, a service type in the OID tree is used as a minimum configuration unit to generate a DNS resource record, where a service type may correspond to only one DNS resource record, and each DNS resource record includes a corresponding authorization expression.

The service configuration information in Step S112 may include a service providing identifier address or a service content. The service providing identifier address may specifically include an identical resource address URL, may be an IP address, or may be other addresses capable of being connected to the services provided by the OID nodes. When contents corresponding to the services provided by the OID nodes are relatively few, the service contents may be directly configured, so the corresponding service contents are directly resolved.

In conclusion, firstly, the parent OID node performs DNS configuration and management not only on the service provided by itself, but also on the services provided by the child OID nodes, so the embodiment can solve the problem that a DNS cannot be resolved due to no configuration of DNS databases for the child OID nodes; and secondly, by proposing the DNS universal mapping name including the wildcard and the authorization expression, the parent OID node may configure the child OID nodes in batches, so the embodiment has the advantage of high configuration efficiency.

Embodiment 2

Figure 3:
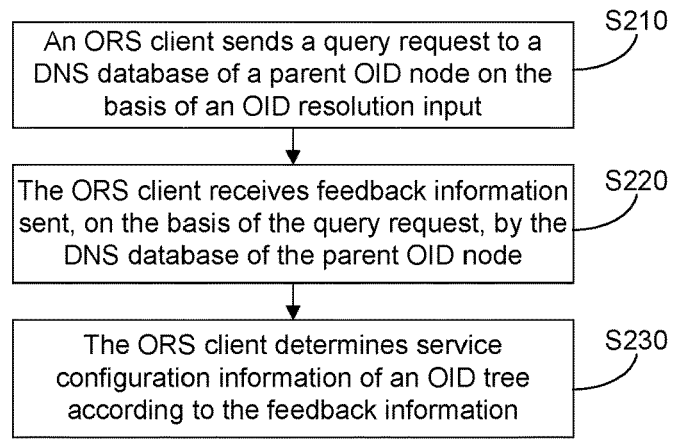
FIG. 3 is a first flowchart of an OID universal resolution method according to an embodiment of the disclosure.

As shown in FIG. 3, the embodiment provides an OID universal resolution method, which includes the steps as follows.

Step S210: An ORS client sends a query request to a DNS database of a parent OID node on the basis of an OID resolution input.

Step S220: The ORS client receives feedback information sent, on the basis of the query request, by the DNS database of the parent OID node.

Step S230: The ORS client determines service configuration information of an OID tree according to the feedback information, the ORS client being a client of an ORS, where the OID tree includes the parent OID node and at least one child OID node of the parent OID node.

The OID resolution method in the embodiment is based on the OID configuration method in embodiment 1. The parent OID node configures a service provided by an OID tree of the child OID nodes into the DNS database of the parent OID node, so during OID resolution, the ORS client directly sends a query request to the DNS database of the parent OID node rather than DNS databases of the child OID nodes.

Compared with the existing DNS database of the parent OID node, the DNS database of the parent OID node not only configures service configuration information of the parent OID node, but also includes service configuration information of the child OID nodes. Obviously, the DNS database of the parent OID node may respond to the query request for querying the service configuration information of the child OID nodes. Thus, even if DNS configuration is not performed on the child OID nodes to form the corresponding DNS databases, OID resolution is not influenced, and the problem that the parent OID node and the child OID nodes cannot be butted cannot be caused.

On the basis of the solutions, configuration modes or formed configuration information of the parent OID node for the services provided by the child OID nodes may be different, so corresponding resolution modes are different. If the parent OID node performs DNS configuration on the child OID nodes by using the existing mode, different from the conventional art, the method in the embodiment enables the ORS to send a query request to the database of the parent OID node and to receive feedback information from the DNS database of the parent OID node, where the feedback information may specifically be DNS resource records of the child OID nodes, and the ORS client may directly feed the DNS resource records back to an OID application.

In the embodiment, in order to improve the configuration efficiency of the parent OID node and to reduce the resolution task of the parent OID node, Step S210 in the embodiment may include:

the ORS client sends a query request to a DNS database of a parent OID on the basis of an OID resolution input, where the OID resolution input includes a DNS mapping name, a service type, a parent OID corresponding to a parent OID node, and a child OID corresponding to a child OID node.

Step S220 may include: the ORS client receives an authorization expression returned, according to the OID resolution input, by the DNS database of the parent OID.

Step S230 may include: the ORS client determines the service configuration information according to the DNS mapping name and the authorization expression.

When the parent OID of the parent OID node is 1.2.156.102 and the child OID of the child OID node is 1.2.156.102.1, during fuzzy matching and fuzzy query, the parent OID and the child OID are matched. The parent OID node will search the DNS database thereof for an authorization expression of a service in such type according to the child OID and the service type, the ORS client receives the authorization expression, and by using the child OID and the authorization expression, service configuration information of the child OID node may be obtained by resolution and replacement, where the service configuration information may include a URL. A specific service interface may be connected through the URL. Specifically, a registration service interface is connected.

The embodiment also provides another universal resolution method of ORS client, which specifically refers to:

the OID resolution input may include a DNS mapping name;

Step S220 includes: receiving a DNS resource record sent, on the basis of the query request, by the DNS database of the parent OID node; and Step S230 may include: querying the DNS resource record according to the service type, and determining the authorization expression; and determining the service configuration information according to the DNS mapping name and the authorization expression.

Different from the previous embodiment, the embodiment has the advantages that: the query request sent to the DNS database of the parent OID node by the ORS does not include a specific OID service type, and only includes a DNS mapping name. In this case, the ORS client will receive, according to the DNS mapping name, all DNS resource records that are matched with the DNS mapping name fed back by the DNS database of the parent OID node, and then ORS client self-queries the DNS resource records again according to the service type to determine an authorization expression, so as to further determine service configuration information. Different from the previous method, the method can re-simplify the query operation of the DNS database of the parent OID node due to the fact that the ORS client self-queries the authorization expression.

On the basis of the above solutions, the authorization expression includes a regular expression and a replacement expression; and Step S230 includes: the ORS client determines groups according to the OID and the regular expression; and the ORS client executes a replacement operation on the obtained groups and the replacement expression to obtain the service configuration information.

The embodiment further defines the operation how the ORS client specifically obtains the service configuration information according to the authorization expression, and has the advantage of simple operation.

On the basis of the solutions, the method further includes:

in a specific implementation process, the ORS client runs an OID application, and the OID application determines information such as an OID corresponding to the service and a service type by resolution according to a received user operation instruction, so as to form the OID resolution input.

According to the method in the embodiment of the disclosure, after forming the OID resolution input, the ORS client does not need to further determine an OID node in the OID tree to which the OID resolution input shall be sent, but may uniformly send the OID resolution input to the DNS database managed by the parent OID node.

Embodiment 3

Figure 4:
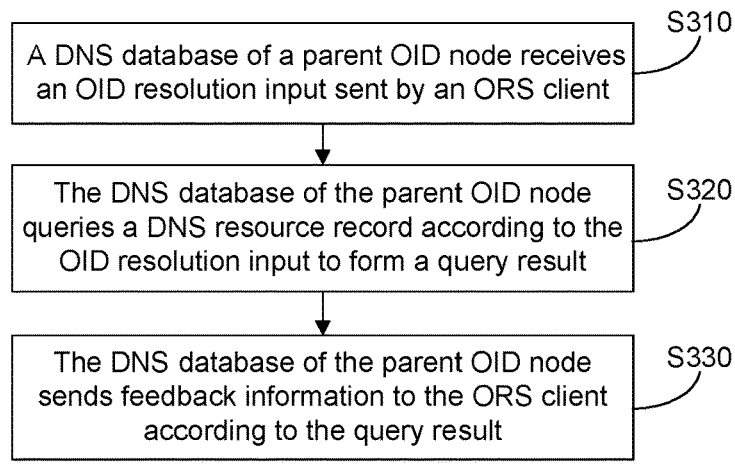
FIG. 4 is a second flowchart of an OID universal resolution method according to an embodiment of the disclosure.

As shown in FIG. 4, the embodiment provides an OID universal resolution method, which includes the steps as follows.

Step S310: A DNS database of a parent OID node receives an OID resolution input sent by an ORS client, the OID resolution input being an OID resolution input of a service provided by an OID tree, and the OID tree including the parent OID node and at least one child OID node of the parent OID node.

Step S320: The DNS database of the parent OID node queries a DNS resource record according to the OID resolution input to form a query result.

Step S330: The DNS database of the parent OID node sends feedback information to the ORS client according to the query result.

On the basis of the OID configuration method in embodiment 1, the embodiment includes service configuration information of the whole OID tree in the DNS database of the parent OID node, that is, the DNS database of the parent OID node not only includes service configuration information of the parent OID node itself, but also includes service configuration information of the child OID nodes. So, when the service configuration information of the child OID nodes is acquired, the DNS database of the parent OID node receives an OID resolution input that is sent from the ORS client and corresponds to any one OID node in the whole OID tree; and the DNS database of the parent OID node queries to form feedback information, and sends the feedback information to the ORS client.

The feedback information may be a service content directly provided by the child OID node, or may be a service connection address connected to the child OID node.

In the embodiment, when the parent OID node performs configuration by using an authorization expression in order to improve the configuration efficiency and to reduce the task load of the DNS database of the parent OID node, the feedback information includes the authorization expression, and the ORS client needs to perform resolution again according to the authorization expression and to finally determine the service configuration information of the child OID node.

There are at least two specific methods for performing, by the DNS database of the parent OID node, universal resolution on the basis of the OID resolution input.

First method: the OID resolution input includes a DNS mapping name and a service type; Step S320 may include: searching a resource record for an authorization expression according to an OID and the service type; and Step S320 may be further divided into that: the authorization expression includes a wildcard, the OID is matched with the parent OID by fuzzy matching to determine whether it is service configuration information configured with the OID node, and a uniform authorization expression of the parent OID node corresponding to the service, in this type, in the OID tree may be found by matching according to the service type.

Step S330 may include: sending the found authorization expression to the ORS client.

Second Method:
the OID resolution input includes a DNS mapping name;
Step S320 may include: querying the DNS resource record according to the DNS mapping name; and
Step S330 may include: sending the DNS resource record matched with the DNS mapping name to the ORS client.

In the embodiment of the disclosure, the DNS mapping name is a domain name OID that at least includes an OID node providing a corresponding service. Specifically, the DNS mapping name may include ors-dummy.*.102.156.2.1.oid-res.org. IN NAPTR, where the IN NAPTR represents a DNS resource record adopting Class=IN, Type=NAPTR. Different from a DNS universal mapping name, the DNS mapping name does not include a wildcard in the DNS universal mapping name.

After receiving or determining the authorization expression, the ORS client may obtain service configuration information of the child OID node according to the OID and the authorization expression finally.

The authorization expression includes a regular expression and a replacement expression.

The regular expression and the OID resolution input jointly determine groups.

The replacement expression and the groups jointly execute a replacement operation to form the service configuration information.

In conclusion, an OID resolution service in the embodiment is resolved by a resource record in DNS data of the parent OID node, and the problem of no resolution resulting from configuration of DNS databases for child OID nodes can be solved likewise.

Embodiment 4

Figure 5:
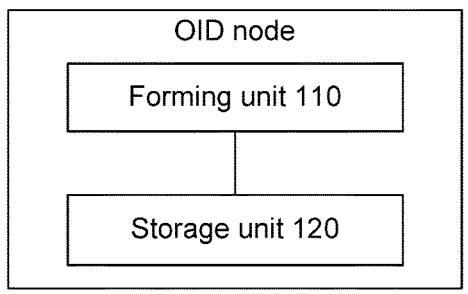
FIG. 5 is a structural diagram of an OID node according to an embodiment of the disclosure.

As shown in FIG. 5, the embodiment provides an OID node. The OID node is a parent OID node and includes:

a forming unit 110, configured to perform DNS configuration on a service provided by an OID tree to form a DNS resource record, the OID tree including the parent OID node and at least one child OID node of the parent OID node; and a storage unit 120, configured to store the DNS resource record in a DNS database of the parent OID node.

A specific structure of the forming unit 110 may include a processor, and the processor may include an electronic component having a processing function such as an Application Processor (AP), a Central Processing Unit (CPU), a Micro Control Unit (MCU), a Digital Signal Processor (DSP) or a Programmable Logic Controller (PLC). A specific structure of the storage unit 120 may include a storage medium such as a Random Access Memory (RAM) or a flash. In some examples, the storage unit 120 may include a non-transitory storage medium connected with the forming unit 110 such as a Read-Only Memory (ROM).

On the basis of the solutions, the forming unit 110 is configured to generate a DNS wildcard mapping name, generate an authorization expression of each service type of the OID tree, and generate a DNS resource record according to the DNS wildcard mapping name, the service type and the authorization expression. The forming unit 110 generates a DNS resource record by using the service type as a minimum configuration unit according to the DNS wildcard mapping name, the service type and the authorization expression, where a service type usually corresponds to a DNS resource record. The DNS wildcard mapping name includes a service identifier, a wildcard, a domain name inverted order OID and an ORS DNS root; and the authorization expression provides a basis for generating service configuration information of the OID tree.

The forming unit 110 may correspond to a single processor, or may correspond to multiple processors. For example, three processors are included. One of the processors is used for generating the DNS universal mapping name and the like, one of the processors is used for generating the authorization expression, and the other one is used for generating the DNS resource record. When a single processor is adopted, the DNS universal mapping name, the authorization expression and the DNS resource record may be generated respectively by thread concurrency or time division multiplexing.

In the embodiment, the authorization expression includes a regular expression and a replacement expression; the regular expression and the OID resolution input jointly determine groups; and the replacement expression and the groups jointly execute a replacement operation to form the service configuration information.

Where, the authorization expression may be recorded as one of elements in the DNS resource record.

The OID node in the embodiment is the parent OID node in the OID tree, that is, a root node of the OID tree. The parent OID node in the embodiment is used for performing DNS configuration on the whole OID tree, so individual DNS configuration does not need to be performed on the child OID nodes in the OID tree, and corresponding DNS databases do not need to be formed. Thus, the deployment cost of the child OID nodes can be reduced. The parent OID node performs uniform configuration, so configuration resources may be fully utilized, the resource utilization rate is improved, and the problem in the conventional art that resolution cannot be performed due to no deployment of DNS databases for child OIDs may be solved obviously.

In conclusion, the OID node in the embodiment provides implementation hardware for the OID configuration method in embodiment 1. In a specific implementation process, the parent OID node further includes structures such as a communication interface, for receiving information such as a configuration instruction of a configuration user.

Embodiment 5

Figure 6:
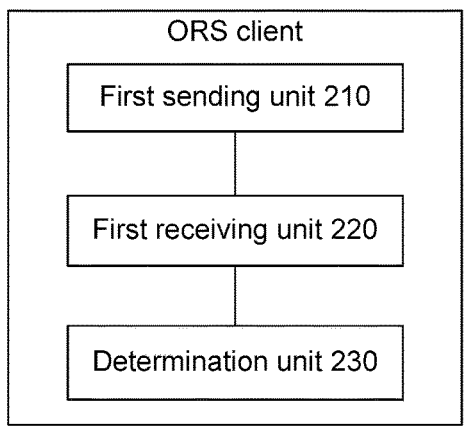
FIG. 6 is a structural diagram of an ORS client according to an embodiment of the disclosure.

As shown in FIG. 6, the embodiment provides an ORS client, which includes:

a first sending unit 210, configured to send a query request to a DNS database of a parent OID node on the basis of an OID resolution input;

a first receiving unit 220, configured to receive feedback information sent, on the basis of the query request, by the DNS database of the parent OID node; and a determination unit 230, configured to determine service configuration information of an OID tree according to the feedback information, the OID tree including the parent OID node and at least one child OID node of the parent OID node.

The first sending unit 210 and the first receiving unit 220 in the embodiment correspond to communication interfaces respectively. The communication interfaces may include a cable communication interface and a radio communication interface. The cable communication interface may include an optical cable communication interface and an electric cable communication interface. The radio communication interface may specifically be an antenna capable of being connected to the Internet. The first receiving unit and the first sending unit may be integrated to correspond to the identical communication interface having both a transmitting function and a receiving function. Or, the specific structure of the first receiving unit may be a receiving interface, and the specific structure of the first sending unit is a sending interface.

The determination unit 230 may correspond to various processors likewise, and specific types of the processors may refer to relevant descriptions for the processor in the previous embodiment.

In conclusion, the embodiment provides implementation hardware for the OID resolution method in embodiment 2. When the ORS client performs OID resolution, a query request is uniformly sent to the DNS database of the parent OID node, and service configuration information is received from the DNS database of the parent OID node. Obviously, when the child OID node is not configured with a DNS database, resolution can be normally performed.

The OID resolution input includes two forms.

First form: the OID resolution input includes a DNS mapping name and a service type;

the first receiving unit 220 is specifically configured to receive an authorization expression returned, according to the OID resolution input, by the DNS database of the parent OID node; and the determination unit 230 is specifically configured to determine the service configuration information according to a DNS mapping name and the authorization expression.

Second form: the OID resolution input includes a DNS mapping name;

the first receiving unit 220 is specifically configured to receive a DNS resource record sent, on the basis of the query request, by the DNS database of the parent OID node, and enable the ORS client to determine the service configuration information of the OID tree according to the feedback information; and the determination unit 230 is specifically configured to query the DNS resource record according to the service type, determine the authorization expression, and determine the service configuration information according to the DNS mapping name and the authorization expression.

The authorization expression includes a regular expression and a replacement expression; the regular expression and the OID resolution input jointly determine groups; and the replacement expression and the groups jointly execute a replacement operation to form the service configuration information. The determination unit 230 is specifically configured to execute a replacement operation on the obtained groups and the replacement expression according to the OID and the regular expression to obtain the service configuration information.

Embodiment 6

Figure 7:
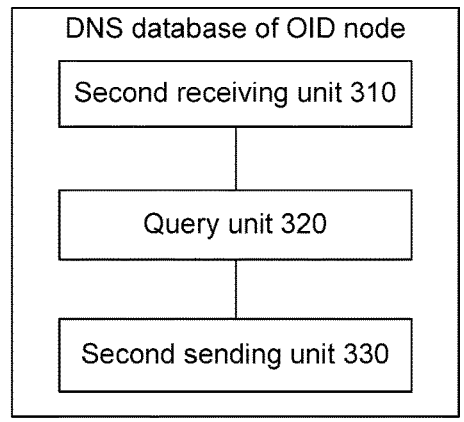
FIG. 7 is a structural diagram of a DNS of an OID node according to an embodiment of the disclosure.

As shown in FIG. 7, the embodiment provides a DNS database of an OID node, which includes:

a second receiving unit 310, configured to receive an OID resolution input sent by an ORS client, the OID resolution input being an OID resolution input of a service provided by an OID tree, and the OID tree including the parent OID node and at least one child OID node of the parent OID node;

a query unit 320, configured to query a DNS resource record according to the OID resolution input to form a query result; and a second sending unit 330, configured to send feedback information to the ORS client according to the query result.

Specific structures of the second receiving unit 310 and the second sending unit 330 may refer to specific structures of the first receiving unit and the second receiving unit in the previous embodiment, which will not be repeated herein.

A specific structure of the query unit 320 may include a processor, and the processor may be any one of an AP, a CPU, a DSP, an MCU or a DSP. The processor may query to obtain the feedback information by executing executable instructions. The DNS database of the OID node includes a database or a storage medium for storing a DNS resource record of data.

When the OID resolution input includes a DNS mapping name and a service type in the OID tree, the query unit 320 is specifically configured to search a resource record for an authorization expression according to an OID and the service type; and the second sending unit 330 is specifically configured to send the found authorization expression to the ORS client. Moreover, the authorization expression includes a regular expression and a replacement expression; the regular expression and the OID resolution input jointly determine groups; and the replacement expression and the groups jointly execute a replacement operation to form the service configuration information.

When the OID resolution input includes a DNS mapping name, the query unit 320 is configured to query the DNS resource record according to the DNS mapping name; and the second sending unit 330 is configured to send the DNS resource record matched with the DNS mapping name to the ORS client.

In the embodiment, the DNS database performs DNS configuration, using a service type as a unit, on each class of service in the OID tree by using the authorization expression, so there are few DNS resource records in the DNS database. Thus, the DNS database in the embodiment has the advantage that corresponding feedback information can be provided for a great number of OID resolution inputs in the OID tree with fewer storage resources.

The DNS database of the OID node in the embodiment provides implementation hardware for the method in embodiment 3. The beneficial effects thereof may refer to the beneficial effects of the method in embodiment 3, which will not be repeated herein.

Several specific examples are provided hereinbelow according to the above embodiments.

Example 1

Figure 8:
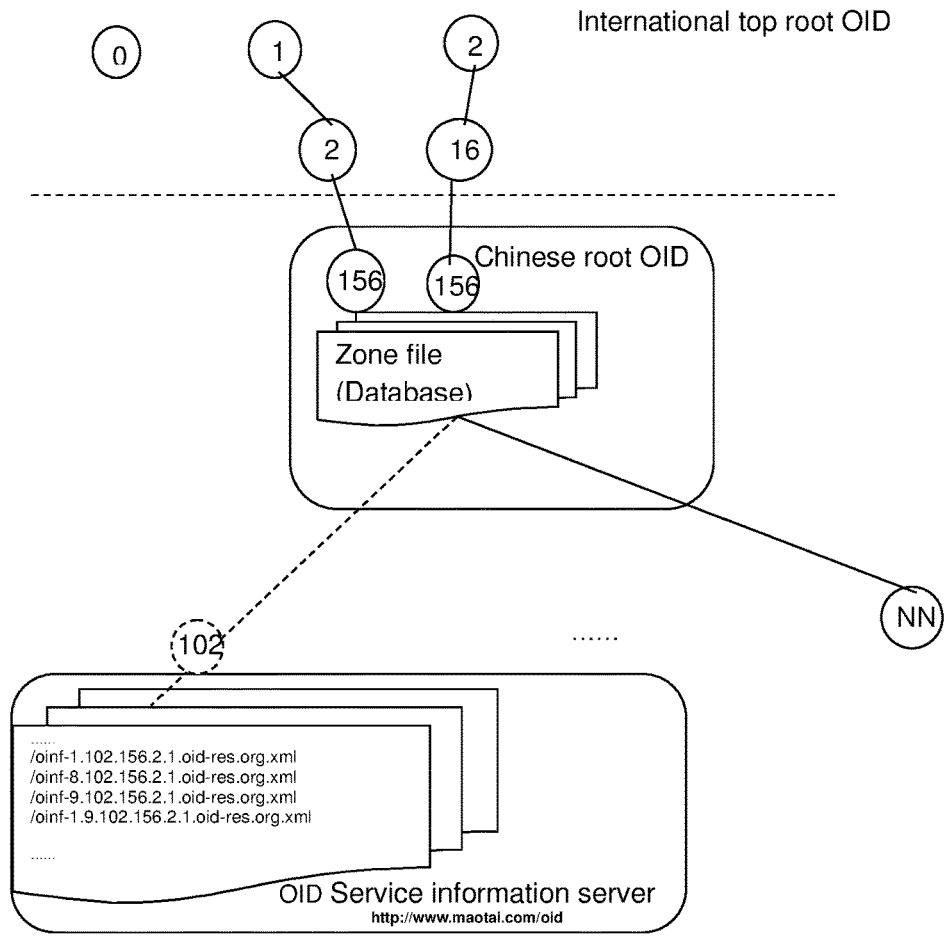
FIG. 8 is a structural diagram of an OID system according to an example of the disclosure.

FIG. 8 shows an OID system. The OID system includes an international top root OID 0, 1, 1.2, 2.16. The OID system further includes a Chinese root OID 1.2.156, a database, an OID node, of which an OID is 1.2.156.102, connected below the Chinese root OID, and an OID node of which an OID is NN. The OID node of which the OID is 1.2.156.102 includes an OID service information server, a user of the OID service information server providing various types of services such as a registration service or a query service. Obviously, multiple OID trees are formed in FIG. 1. Specifically, multiple OID nodes exist between the OID node of which the OID is 1 and the OID node of which the OID is 1.2.156.102. These OID nodes form an OID tree including four stages of OID nodes.

Background: Maotai Distillery applies an OID for coding, marking and resolving liquor products at a national root node, but doesn't want to deploy a corresponding DNS to support a resolution service.

In this case, OID configuration and resolution may be performed at the national root node by using the method in the embodiment of the disclosure to directly provide a resolution service oriented to Maotai Distillery.

Parent OID node: 1.2.156, i.e., the national root node;
Child OID node: 1.2.156.102, Maotai Distillery root OID;
Resolved OID: 1.2.156.102.8, OID code of a certain bottle of Maotai;
OINF service: configured as a URL address of liquor product basic information;
Authorization expression: including a regular expression and a replacement expression;
OID input format: adopting a DNS mapping name corresponding to an OID;

in a DNS database of the parent OID node, two service types of a child OID node (Maotai Distillery) are configured.

If the child OID node may provide two services, a service type of the first service is ORS+RINF, the second service type is ORS+OINF, and the child OID node has an OID 1.102.156.2.8 providing the service type.

An OID universal mapping name of the two services is ors-dummy.*.102.156.2.1.oid-res.org. The ors-dummy is a service type; * is a wildcard; and the 102.156.2.1 is a domain name inverted order OID of the child OID node. The oid-res.org is an ORS DNS root, representing a root position of an ORS in an Internet DNS. The only difference lies in that the service types of the two services are different.

According to the DNS universal mapping name and the service type, configuration of the parent OID node forms the following DNS resource records:

| Sequence number | Preference | Flags | Service (service type) | Authorization expression | Replacement |
|---|---|---|---|---|---|
| 0 | 100 | "u" | "ORS+RINF" | "!^.*$!http://www.anydomain.com/1/2/156/102/rinfo.xml! | • |
| 1 | 100 | "u" | "ORS+OINF" | "!^ors-dummy\.(.*)$!http://www.maotai.com/oid/oinfo-$1xml!"" | • |

One row in the above table represents a DNS resource record, where each service type corresponds to a DNS resource record. $1 in the authorization expression is a group replacement placeholder.

Maotai Group provides an OID information service address: www.maotai.com/oid, and a server corresponding to the address provides an access to an OID service document in accordance with semantics of the authorization expression.

When a certain user takes a bottle of Maotai corresponding to a resolved OID, product information of the liquor is queried by means of an application, and an ORS client is called to resolve an OINF service of 1.2.156.102.8.

Figure 9:
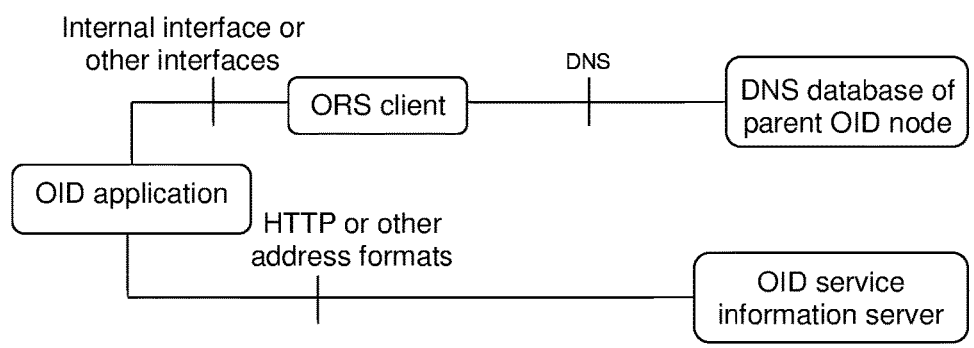
FIG. 9 is a flowchart of an OID resolution method according to an example of the disclosure.

In FIG. 9, an OID application runs on the ORS client, so the OID application is connected to the ORS client through an internal interface or other interfaces; and the ORS client is in data connection with a DNS of the parent OID node. The OID application is also connected to the OID service information server on the basis of a Hyper Text Transport Protocol (HTTP) or other address formats.

An OID resolution flow includes OID universal resolution and OID application resolution.

As shown in FIG. 9, the OID universal resolution includes:

an ORS client receives a service address from the OID application, and obtains a corresponding OID 1.2.156.102.8 by resolution, a service type being an OINF service.

The ORS client sends the OINF service and the 1.2.156.102.8 to the DNS database of the parent OID node.

The DNS database of the parent OID node performs fuzzy matching on the 1.2.156.102.8 with the wildcard, and determines that corresponding service configuration information is stored. The DNS resource records are queried according to the OINF service type, and an authorization expression, "!^ors-dummy\.(*)$!http://www.maotai.com/oid/oinfo-$1xml!"", corresponding to the service type is found in the DNS resource record 1.

In the authorization expression, a part between the first "!" and the second "!" corresponds to a regular expression in the authorization expression, and a part between the second "!" and the third "!" corresponds to a replacement expression.

After receiving the authorization expression fed back by the DNS database of the parent OID node or self-determining the authorization expression according to the resource record fed back by the DNS database of the parent OID node, the ORS client scans a DNS mapping name ors-dummy.8.102.156.2.1.oid-res.org., corresponding to the resolved OID, according to the regular expression (^ors-dummy\.(.*)$) in the authorization expression to obtain a group $1 8.102.156.2.1.oid-res.org. The ORS client replaces $1 in the replacement expression (http://www.maotai.com/oid/oinfo-$1.res.org.xml) by using the obtained group $1 to finally obtain a URL address of an OINF service of the resolved OID:

http://www.maotai.com/oid/oinfo-8.102.156.2.1.oid-res.org.xml.

The ORS client returns the URL address to the OID application, and the OID application continuously accesses a www.maotai.com server by using the URL address, and obtains and displays final product information corresponding to the OID.

The OID application resolution may include: acquiring corresponding service information according to the service address returned by the OID universal resolution, and executing corresponding OID application logics.

Example 2

In a DNS corresponding to a parent OID node of which an OID is 1.2.156, accesses to an OID 1.2.156.102 of a child OID node and all OIDs in a child tree thereof are redirected to a subordinate DNS through an NS record:

102.156.2.1.oid-res.org. IN NS 202.202.1.102 where 102.156.2.1.oid-res.org. represents an authorization domain name of the child OID 1.2.156.102, IN NS represents a DNS resource record type, and 202.202.1.102 represents an address of a DNS corresponding to the child OID.

OID service configuration sample: DNS configuration is performed on an OID service provided for the child OID 1.2.156.102 in the DNS corresponding to the parent OID node, and if the OID corresponding to the service is 1.2.156.102.8 and the service type is an OINF service, a DNS resource record will be formed:

ors-dummy.8.102.156.2.1.oid-res.org. IN NAPTR 0 100 "u" "ORS+OINF" "!^.1!http://www.maotai.com/oid/oinf-1.2.156.102.8.xml!".

A specific configuration process is as follows.

The parent OID node forms a DNS mapping name; DNS mapping name=ors-dummy.(or other values)+domain name inverted order (dot-notation OID).+ORS DNS root, where ors-dummy is used for distinguishing an OID service from resource records of other non-OID service types in the DNS. oid-res.org. represents a root position of an ORS in an Internet DNS, and the root position may be configured as other values such as ors-dummy.8.102.156.2.1.oid-res.org. The oid-res.org. represents a DNS mapping name corresponding to 1.2.156.102.8.

In addition, IN NAPTR represents that the DNS stores service configuration information of an OID object by using a resource record Class=IN, Type=NAPTR. The specific service configuration information is embodied in RDATA of the resource record. The service configuration information is rdata of the OINF service of 1.2.156.102.8, including several fields of the following table:

| Sequence number | Preference | Flags | Service (service type) | Expression | Replacement |
|---|---|---|---|---|---|
| 0 | 100 | "u" | "ORS+OINF" | "!^.*$!http://www.maotai.com/oid/oinf-1.2.156.102.8.xml!" | . |

A Service identifier is used for distinguishing different OID service types such as OID+COID and OID+RINF.

The expression is used for storing specific service configuration information of the OID object such as a URL address.

Each service in the child OID node in the embodiment needs to be individually configured by the parent OID node to form a DNS resource record.

OID resolution includes a universal resolution process and an application resolution process.

OID universal resolution process: the ORS provides a query service outwards in a DNS interface manner, the ORS client converts an OID to be queried into a corresponding DNS mapping name to serve as a domain name parameter, CLASS=IN and TYPE=NAPTR serve as query types, and a DNS query is initiated. The DNS query responds to return a corresponding NAPTR resource record carrying service configuration information: a service type, an expression and the like.

OID application resolution process: the application resolution process follows the universal resolution process. If the service configuration information returned by the universal resolution process includes a service address, the application resolution will access the address generally to acquire final information of the service, and corresponding application logics are executed.

The embodiments of the disclosure also provide a computer storage medium. Computer-executable instructions are stored in the computer storage medium. The computer-executable instruction is used for at least one of the aforementioned methods. The computer storage medium may be used for executing one or more of the methods shown in FIG. 1 to FIG. 4. The computer storage medium may be various media capable of storing program codes such as mobile storage equipment, an ROM, an RAM, a magnetic disk or an optical disk, and is a non-instant storage medium, alternatively.

The above is only a specific implementation mode of the disclosure. However, the scope of protection of the disclosure is not limited thereto. Any modifications made in accordance with the principle of the disclosure shall be understood as falling within the scope of protection of the disclosure.

Here, a first detection unit 41, a communication unit 42, a second detection unit 45, a radio frequency circuit control unit 43 and an antenna selection unit 44 may be implemented by an AP, a CPU, a DSP or a Field Programmable Gate Array (FPGA) in a mobile terminal.

The embodiments of the disclosure also provide a computer storage medium. A computer program is stored in the computer storage medium. The computer program is used for executing a method for reducing an SAR of a mobile terminal as shown in FIG. 1 according to the embodiment of the disclosure.

The above is only preferable embodiments of the disclosure, and not intended to limit the scope of protection of the disclosure. Any modifications made in accordance with the principle of the disclosure shall be understood as falling within the scope of protection of the disclosure.

What is claimed is:

1. An Object Identifier (OID) configuration method, comprising:
performing, by a parent OID node, Domain Name System (DNS) configuration on a service provided by an OID tree to form a DNS resource record, the OID tree comprising the parent OID node and at least one child OID node of the parent OID node; and
storing, by the parent OID node, the DNS resource record in a DNS database of the parent OID node;
wherein performing, by a parent OID node, DNS configuration on a service provided by an OID tree to form a DNS resource record comprises:
generating, by the parent OID node, a DNS wildcard mapping name, the DNS wildcard mapping name comprising a service identifier, a wildcard, a domain name inverted order OID and an OID Resolution System (ORS) DNS root;
generating, by the parent OID node, an authorization expression of each service type of the OID tree, the authorization expression providing a basis for generating service configuration information of the OID tree; and
generating, by the parent OID node, the DNS resource record according to the DNS wildcard mapping name, the service type and the authorization expression.

2. The method according to claim 1, wherein
the authorization expression comprises a regular expression and a replacement expression;
the regular expression and an OID resolution input jointly determine groups; and
the replacement expression and the groups jointly execute a replacement operation to form the service configuration information.

3. The method according to claim 2, wherein the service configuration information comprises a service providing identifier address or a service content.

4. An Object Identifier (OID) universal resolution method, the method comprising:
sending, by an OID Resolution System (ORS) client, a query request to a Domain Name System (DNS) database of a parent OID node on the basis of an OID resolution input;
receiving, by the ORS client, feedback information sent, on the basis of the query request, by the DNS database of the parent OID node; and
determining, by the ORS client, service configuration information of an OID tree according to the feedback information,
the OID tree comprising the parent OID node and at least one child OID node of the parent OID node.

5. The method according to claim 4, wherein
the OID resolution input comprises a DNS mapping name and a service type;
receiving, by the ORS client, feedback information sent, on the basis of the query request, by the DNS database of the parent OID node comprises:
receiving, by the ORS client, an authorization expression returned, according to the OID resolution input, by the DNS database of the parent OID node; and
determining, by the ORS client, service configuration information of an OID tree according to the feedback information comprises:
determining, by the ORS client, the service configuration information according to the DNS mapping name and the authorization expression.

6. The method according to claim 4, wherein
the OID resolution input comprises a DNS mapping name;
receiving, by the ORS client, feedback information sent, on the basis of the query request, by the DNS database of the parent OID node comprises:
receiving a DNS resource record sent, on the basis of the query request, by the DNS database of the parent OID node; and
determining, by the ORS client, the service configuration information of an OID tree according to the feedback information comprises:
querying the DNS resource record according to a service type, and determining an authorization expression; and
determining the service configuration information according to the DNS mapping name and the authorization expression.

7. The method according to claim 5, wherein
the authorization expression comprises a regular expression and a replacement expression; and
determining the service configuration information according to the DNS mapping name and the authorization expression comprises:
determining, by the ORS client, groups according to an OID and the regular expression; and
executing, by the ORS client, a replacement operation on the groups and the replacement expression to obtain the service configuration information.

8. The method according to claim 4, wherein
the DNS database of the parent OID node stores a DNS resource record of the at least one child OID node; and
the DNS resource record is generated according to a DNS wildcard mapping name, a service type and an authorization expression, the DNS wildcard mapping name comprises a service identifier, a wildcard, a domain name inverted order OID and an ORS DNS root, and the authorization expression provides the basis for generating the service configuration information of the OID tree.

9. An Object Identifier (OID) universal resolution method, comprising:
receiving, by a Domain Name System (DNS) database of a parent OID node, an OID resolution input sent by an OID Resolution System (ORS) client, the OID resolution input being an OID resolution input of a service provided by an OID tree, and the OID tree comprising the parent OID node and at least one child OID node of the parent OID node;
querying, by the DNS database of the parent OID node, a DNS resource record according to the OID resolution input to form a query result; and sending, by the DNS database of the parent OID node, feedback information to the ORS client according to the query result.

10. The method according to claim 9, wherein
the OID resolution input comprises an OID corresponding to an OID node in the OID tree and a service type;
querying, by the DNS database of the parent OID node, a DNS resource record according to the OID resolution input to form a query result comprises:
  searching a resource record for an authorization expression according to the OID and the service type; and
sending, by the DNS database of the parent OID node, feedback information to the ORS client according to the query result comprises:
  sending the authorization expression to the ORS client.

11. The method according to claim 9, wherein
the OID resolution input comprises a DNS mapping name;
querying, by the DNS database of the parent OID node, a DNS resource record according to the OID resolution input to form a query result comprises:
  querying the DNS resource record according to the DNS mapping name; and
sending, by the DNS database of the parent OID node, feedback information to the ORS client according to the query result comprises:
  sending the DNS resource record matched with the DNS mapping name to the ORS client.

12. The method according to claim 9, wherein
the DNS database of the parent OID node stores the DNS resource record of the at least one child OID node; and
the DNS resource record is generated according to a DNS wildcard mapping name, a service type and an authorization expression, the DNS wildcard mapping name comprises a service identifier, a wildcard, a domain name inverted order OID and an ORS DNS root, and the authorization expression provides the basis for generating service configuration information of the OID tree.

13. An Object Identifier (OID) node, which is a parent OID node, the OID node comprising:
a processor; and
a memory for storing instructions executable by the processor;
wherein the processor is configured to:
  perform Domain Name System (DNS) configuration on a service provided by an OID tree to form a DNS resource record, the OID tree comprising the parent OID node and at least one child OID node of the parent OID node;
  store the DNS resource record in a DNS database of the parent OID node; and
  generate a DNS wildcard mapping name, generate an authorization expression of each service type of the OID tree, and generate the DNS resource record according to the DNS wildcard mapping name, the service type and the authorization expression,
  the DNS wildcard mapping name comprising a service identifier, a wildcard, a domain name inverted order OID and an OID Resolution System (ORS) DNS root, and the authorization expression providing a basis for generating service configuration information of the OID tree.

14. An Object Identifier (OID) Resolution System (ORS) client, comprising:
a processor; and
a memory for storing instructions executable by the processor;
wherein the processor is configured to:
  send a query request to a Domain Name System (DNS) database of a parent OID node on the basis of an OID resolution input;
  receive feedback information sent, on the basis of the query request, by the DNS database of the parent OID node; and
  determine service configuration information of an OID tree according to the feedback information,
  the OID tree comprising the parent OID node and at least one child OID node of the parent OID node.

15. The ORS client according to claim 14, wherein
the OID resolution input comprises an OID corresponding to an OID node and a service type;
the processor is further configured to receive an authorization expression returned, according to the OID resolution input, by the DNS database of the parent OID node; and
determine the service configuration information according to a DNS mapping name and the authorization expression.

16. The ORS client according to claim 14, wherein
the OID resolution input comprises a DNS mapping name;
the processor is further configured to receive a DNS resource record sent, on the basis of the query request, by the DNS database of the parent OID node, and enable the ORS client to determine the service configuration information of the OID tree according to the feedback information; and
query the DNS resource record according to a service type, determine an authorization expression, and determine the service configuration information according to the DNS mapping name and the authorization expression.

17. A Domain Name System (DNS) database of a parent Object Identifier (OID) node, comprising:
a processor; and
a memory for storing instructions executable by the processor;
wherein the processor is configured to:
  receive an OID resolution input sent by an OID Resolution System (ORS) client, the OID resolution input being an OID resolution input of a service provided by an OID tree, and the OID tree comprising the parent OID node and at least one child OID node of the parent OID node;
  query a DNS resource record according to the OID resolution input to form a query result; and
  send feedback information to the ORS client according to the query result.

18. The DNS database of a parent OID node according to claim 17, wherein
the OID resolution input comprises an OID corresponding to an OID node in the OID tree and a service type;
the processor is further configured to search a resource record for an authorization expression according to the OID and the service type; and
send the authorization expression to the ORS client.

19. The DNS database of a parent OID node according to claim 17, wherein
the OID resolution input comprises a DNS mapping name;

the processor is further configured to query the DNS resource record according to the DNS mapping name; and send the DNS resource record matched with the DNS mapping name to the ORS client.

20. A non-transitory computer storage medium, computer-executable instructions being stored in the non-transitory computer storage medium, wherein the computer-executable instructions are used for executing the method according to claim 1.

* * * * *